(12) United States Patent
De Angelis et al.

(10) Patent No.: US 7,553,473 B2
(45) Date of Patent: Jun. 30, 2009

(54) PROCESS FOR THE REMOVAL OF HYDROGEN SULFIDE, BY MEANS OF ITS OXIDATION IN THE PRESENCE OF HETERO POLYACIDS

(75) Inventors: Alberto De Angelis, Legnano (IT); Giuseppe Bellussi, Piacenza (IT); Paolo Pollesel, San Donato Milanese (IT); Ugo Romano, Vimercate (IT); Carlo Perego, Carnate (IT)

(73) Assignee: ENI S.p.A., Rome (IT)

( * ) Notice: Subject to any disclaimer, the term of this patent is extended or adjusted under 35 U.S.C. 154(b) by 196 days.

(21) Appl. No.: 10/588,215

(22) PCT Filed: Jan. 20, 2005

(86) PCT No.: PCT/EP2005/000669

§ 371 (c)(1),
(2), (4) Date: Jan. 10, 2007

(87) PCT Pub. No.: WO2005/075351

PCT Pub. Date: Aug. 18, 2005

(65) Prior Publication Data

US 2007/0178033 A1 Aug. 2, 2007

(30) Foreign Application Priority Data

Feb. 5, 2004 (IT) .......................... MI2004A0175

(51) Int. Cl.
*C01B 17/04* (2006.01)
*C01B 17/05* (2006.01)
*C10L 3/10* (2006.01)

(52) U.S. Cl. .............. 423/573.1; 423/576.4; 423/576.5; 48/127.3; 48/127.5; 48/127.7

(58) Field of Classification Search .............. 423/573.1, 423/576.4, 576.5; 48/127.3, 127.5, 127.7
See application file for complete search history.

(56) References Cited

U.S. PATENT DOCUMENTS

| 4,891,205 A | 1/1990 | Bedell |
| 5,026,503 A | 6/1991 | Stewart |
| 5,215,728 A | 6/1993 | McManus |
| 5,273,734 A | 12/1993 | Sawyer et al. |
| 5,705,685 A | 1/1998 | Lyons et al. |
| 2007/0178033 A1 | 8/2007 | De Angelis et al. |
| 2008/0207951 A1* | 8/2008 | De Angelis et al. ........... 568/26 |

FOREIGN PATENT DOCUMENTS

EP 0 215 505 3/1987

OTHER PUBLICATIONS

U.S. Appl. No. 12/065,909, filed Mar. 6, 2008, Bellussi, et al.
U.S. Appl. No. 11/816,755, filed Aug. 21, 2007, De Angelis, et al.
Gary Nagl, "Controlling Hydrogen Sulphide Emissions", The British Sulphur Co., No. 250, XP 000692274, pp. 45-47, 49, 51, 1997.

* cited by examiner

*Primary Examiner*—Timothy C Vanoy
(74) *Attorney, Agent, or Firm*—Oblon, Spivak, McClelland, Maier & Neustadt, P.C.

(57) ABSTRACT

Hydrogen sulfide is oxidized to sulfur by means of treatment with an aqueous acid solution containing trivalent iron and a hetero polyacid having formula (I): $H_nXV_yM_{(12-y)}O_{40}$; or a sole hetero polyacid having formula (II): $H_nMeM_{12}O_{40}$; wherein the symbols X, M Me n and y are specified in the text. At the end of the oxidation, the solution is treated with gas containing oxygen to re-oxidize the reduced metal.

14 Claims, No Drawings

PROCESS FOR THE REMOVAL OF HYDROGEN SULFIDE, BY MEANS OF ITS OXIDATION IN THE PRESENCE OF HETERO POLYACIDS

The present invention relates to a new process for the removal of hydrogen sulfide, by means of its oxidation in the presence of hetero polyacids.

More specifically, the present invention relates to a new process for the oxidation of hydrogen sulfide coming from the purification treatment of hydrocarbons of a fossil nature, for example crude oil or natural gas.

As is well known, sulfur can be present in a considerable amount both in extracted crude oil and natural gas. Sulfur can be present in natural gas, in the form of $H_2S$, in a percentage molar quantity which can reach 10%, and in certain particular cases it can even exceed 20%, referring to the gas.

When present in gas in such high concentrations, the hydrogen sulfide is separated using various systems, of which the most widely used is absorption in solutions of ethanol amines. Once it has been obtained in its concentrated state, the hydrogen sulfide is transformed into sulfur by means of the Claus process.

The hydrogen sulfide can also be disposed of, if the Claus process cannot be used, either due to the relatively modest quantities of $H_2S$ or for the fact that the concentration of hydrogen sulfide is lower than a certain quantity or finally because the reservoir is in an area which is inadequate for the installation of the Claus process itself, by transforming it into sulfur by means of the chemical redox process.

The chemical-redox process which currently has improved characteristics and is also the most widely used process in the world, is the Lo-Cat process.

In this process, the hydrogen sulfide is absorbed in an alkaline solution containing trivalent iron (0.5-1.5 g/l of iron) in the form of a complex, for example as the complex of ethylene diamino-tetra-acetic acid or analogous molecules. The trivalent iron oxidizes the hydrogen sulfide to sulfur and is reduced to bivalent iron. In a subsequent passage, the aqueous solution of bivalent iron, after being filtered from the sulfur formed, is re-oxidized by air re-obtaining a solution of trivalent iron, which is used again. It is necessary to operate in an alkaline environment otherwise the bivalent iron potential, in an acid environment, would be too high and air alone would not be sufficient to re-oxidize it to trivalent iron.

The chemical-redox process is extremely effective and allows total conversions of hydrogen sulfide to be obtained, it is also a very flexible process and has in fact been widely diffused throughout the world. This process, however, has various drawbacks. Above all, when operating in an alkaline solution, there is the radicalic oxidation of the iron ligand with the degradation of the ligand itself and the precipitation of iron as sulfide. This has two strong consequences on the process: the ligand, which is expensive, must be continuously reintegrated, furthermore the sulfur produced is impure of iron sulfide and this makes it absolutely unsuitable for commercialization. Due to the fact that the reaction is carried out at an alkaline pH (8-9), there are also two parasite reactions which jeopardize the process:

the carbonatation of the solution with the absorption of carbon dioxide from the air; and the oxidation of the hydrogen sulfide absorbed, in the presence of oxygen, to thiosulfate rather than sulfur.

The Applicants have now found, and this forms an object of the present invention, better defined in the enclosed claims, that the oxidation reaction of hydrogen sulfide can be advantageously carried out in an acid environment, with a solution of trivalent iron, substantially at the same concentrations used on an industrial scale for effecting the reaction or also at higher concentrations, in the presence of a modest quantity of a hetero polyacid having redox properties. In the presence of said hetero polyacid, the re-oxidation of the iron reduced to the bivalent state, at the end of the oxidation of the hydrogen sulfide, takes place rapidly with air also at atmospheric pressure and within a short period of time.

There are numerous advantages in carrying out the reaction at acid pH, in the presence of a hetero polyacid and these are more specifically:

1. ligands are not necessary for maintaining the iron in solution, as trivalent iron is extremely soluble in an acid environment;
2. the sulfur precipitated is free of iron sulfide impurity, which does not precipitate at acid pH; this sulfur is also yellow-coloured and is free of any other impurity;
3. there are no side reactions, such as carbonatation of the solution and oxidation of the hydrogen sulfide to thiosulfate, as these cannot take place in an acid environment;
4. the sulfur formed also proves to be crystalline and can be easily filtered. It is therefore not necessary to use surface-active agents which are essential when sulfur is precipitated in an alkaline environment. Consequently, in addition to the saving in the cost of surface-active agents, there is a further advantage due to the fact that the formation of foams, caused by the surface-active agents themselves, which is verified during the re-oxidation of bivalent iron with air in the Lo-Cat process, is avoided;
5. the potential of the $Fe^{II}/Fe^{III}$ pair is much higher in a strongly acid solution (up to pH 2 approximately) and this increases the efficiency of the oxidation of the hydrogen sulfide to sulfur.

The re-oxidation in an acid environment of the solution of bivalent iron, in the absence of hetero polyacid, on the contrary, does not take place even after several days, not even when the solution is heated to a temperature close to boiling point to accelerate the reaction rate.

Hetero polyacids which are active in promoting the oxidation of reduced iron, are for example, hetero polyacids having redox properties such as, for example, those described by general formula (I):

$$H_nXV_yM_{(12-y)}O_{40} \qquad (I)$$

wherein n is an integer ranging from 3 to 6, X is an element selected from P, Si, As, B, Ge, y is an integer ranging from 1 to 3 and M consists of Mo or W.

In a particular application, the hetero polyacid is used in solid form.

Possible examples of solid forms insoluble in water are:

1) partial and complete salification with metals whose salts are insoluble such as, for example, cesium, ammonium, potassium prepared according to the method described in literature by A. Corma et al. in J. of Catal., 1996, vol. 164, 422-432; silver prepared according to the method described in literature by J. B. Moffat et al. in Cat. Lett., 1998, vol. 55, 183-188; thallium(I) prepared according to the method described in literature by J. B. Moffat et al. in J. of Catal., 1998, vol. 177, 335-342;
2) laying and immobilization on silica according to what is described in literature, for example by Y. Izumi et al. In Appl. Catal. A, 1999, vol. 181, 277-282;
3) laying and immobilization on mesoporous molecular sieves, such as HMS and MCM-41, according to what is described in literature, for example by W. Chu et al. in Cat. Lett., 1996, vol. 42, 201-208;

4) laying and immobilization on activated carbon according to what is described in literature, for example, by M. E. Chimienti et al. in Appl. Catal. A, 2001, vol. 208, 7-19.

In the solid and insoluble form in water, the hetero polyacid can be used in a slurry reactor, where the solid is dispersed in the process liquid, or in a fixed bed reactor. In both applications, the catalyst is suitably formed, for example in microspheres, for the slurry reactor, or in pellets, for the fixed bed rector, according to the well known technologies.

In the case of use in the solid insoluble form in water, the hetero polyacid remains confined in the oxidation reactor alone.

It has been surprisingly found that the reaction can be advantageously carried out in the presence of hetero polyacids without the presence of the trivalent iron solution, when the hetero polyacid itself contains instead of the hetero element X a metal capable of exerting redox properties, such as, for example, a general hetero polyacid having formula (II):

$$H_n MeM_{12}O_{40} \qquad (II)$$

wherein n is an integer ranging from 2 to 7, Me can be Fe, Co, Mn, Cu, Cr, whereas M consists of Mo or W.

In this case, it is the metal Me, in the centre of the hetero polyacid structure, which oxidizes the hydrogen sulfide to sulfur and is reduced to a lower oxidation state than the starting one. The metal Me is then re-oxidized to the initial oxidation state by simply bubbling air into the reaction solution, after filtering the sulfur produced.

Some illustrative but non-limiting examples are provided for a better understanding of the present invention and for its embodiment.

EXAMPLE 1

Synthesis of the Acid $H_4PVMo_{11}O_{40}$ 1.22 g of sodium meta-vanadate (equal to 0.01 moles) are dissolved in 100 ml of distilled water, at 60° C., to which 3.58 g of $Na_2HPO \cdot 12H_2O$ (equal to 0.01 moles) are subsequently added, followed by 26.61 g of $Na_2MoO_4 \cdot 2H_2O$ (equal to 0.11 moles). 20 g of nitric acid at 60% are finally added to this solution, obtaining the condensation of the hetero polyacid, which is manifested with the formation of a deep red colouring. The solution is brought to a small volume until it begins to crystallize, the same volume of sulfuric acid, 2N, is then added, and ethyl ether, applying the Drechsel method (see Handbook of Preparative Inorganic Chemistry of G. Brauer Academic Press—New York 1965), extracting the hetero polyacid as a complex with diethyl ether.

By evaporating the diethyl ether, the hetero polyacid $H_4PVMo_{11}O_{40}$ is obtained in the form of orange crystals. The X-ray spectrum of this compound perfectly corresponds to that indicated in literature (O. Akba et al. Synth. React. Inorg. Met-org. Chem., 27(9), 1399-1415, 1997).

EXAMPLE 2

Synthesis of the Acid $H_5PV_2Mo_{10}O_{40}$ 7.32 g of sodium meta-vanadate (equal to 0.06 moles) to are dissolved in 100 ml of distilled water, at 60° C., to which 3.58 g of $Na_2HPO \cdot 12H_2O$ (equal to 0.01 moles) are subsequently added, followed by 24.19 g of $Na_2MoO_4 \cdot 2H_2O$ (equal to 0.1 moles). 20 g of nitric acid at 60% are finally added to this solution, obtaining the condensation of the hetero polyacid which is manifested with the formation of a deep red colouring. The solution is brought to a small volume until it begins to crystallize, the same volume of sulfuric acid, 2N, is then added, and ethyl ether, applying the Drechsel method (see Handbook of Preparative Inorganic Chemistry of G. Brauer Academic Press—New York 1965), extracting the hetero polyacid as a complex with diethyl ether.

By evaporating the diethyl ether, the hetero polyacid $H_5PV_2Mo_{10}O_{40}$ is obtained in the form of reddish-orange crystals. The X-ray spectrum of this compound perfectly corresponds to that indicated in literature (see example 1).

EXAMPLE 3

Synthesis of the Acid $H_6PV_3Mo_9O_{40}$ 14.64 g of sodium meta-vanadate (equal to 0.12 moles) are dissolved in 200 ml of distilled water, at 60° C., to which 7.16 g of $Na_2HPO \cdot 12H_2O$ (equal to 0.02 moles) are subsequently added, followed by 21.76 g of $Na_2MoO_4 \cdot 2H_2O$ (equal to 0.09 moles). 40 g of nitric acid at 60% are finally added to this solution, obtaining the condensation of the hetero polyacid which is manifested with the formation of a deep red colouring. The solution is brought to a small volume until it begins to crystallize, the same volume of sulfuric acid, 2N, is then added, and ethyl ether, applying the Drechsel method, extracting the hetero polyacid as a complex with diethyl ether.

By evaporating the ether, the hetero polyacid $H_6PV_3Mo_9O_{40}$ is obtained in the form of dark red crystals. The X-ray spectrum of this compound perfectly corresponds to that indicated in literature (see example 1).

EXAMPLE 4

Synthesis of the Acid $H_6PV_3W_9O_{40}$ 14.64 g of sodium metavanadate (equal to 0.12 moles) are dissolved in 200 ml of distilled water, at 60° C., to which 7.16 g of $Na_2HPO \cdot 12H_2O$ (equal to 0.02 moles) are subsequently added, followed by 29.70 g of $Na_2WoO_4 \cdot 2H_2O$ (0.09 moles). 40 g of nitric acid at 60% are finally added to this solution, obtaining the condensation of the hetero polyacid which is manifested with the formation of a deep red colouring. The solution is brought to a small volume until it begins to crystallize, the same volume of sulfuric acid, 2N, is then added, and ethyl ether, applying the Drechsel method, extracting the hetero polyacid as a complex with diethyl ether.

By evaporating the ether, the hetero polyacid $H_6PV_3W_9O_{40}$ is obtained in the form of dark red crystals. The X-ray spectrum of this compound perfectly corresponds to that indicated in literature (O. Akba et al. Synth. React. Inorg. Met-org. Chem., 27(9), 1399-1415 (1997)).

EXAMPLE 5

Synthesis of the Acid $H_5Co^{(III)}W_{12}O_{40}$ 49.5 g of di-hydrate sodium tungstate are dissolved in 100 ml of distilled water. 10 ml of acetic acid are added to this solution. A limpid solution is obtained with a pH equal to 6.5. Another solution is then prepared by dissolving 6.22 g of cobalt acetate tetrahydrate in 32 ml of distilled water to which 2 drops of acetic acid are added.

The first solution, to which the second solution is added dropwise, is brought to boiling point. During the addition, a pink precipitate is formed, which is rapidly re-dissolved. Finally, a limpid emerald-green solution containing the hetero polyacid, is obtained. A solution of 33 g of potassium chloride in 58 ml of distilled water is added to this solution of hetero polyacid. The hetero polyacid precipitates as potassium salt $K_6CoW_{12}O_{40}$, with a quantitative yield, as emerald green cubic crystals.

X-ray diffraction of the compound provides a spectrum completely identical to that specified in literature.

30 g of the salt $K_6CoW_{12}O_{40}$ are dissolved in 30 ml of a 2N solution of sulfuric acid and the mixture is brought to boiling point. Potassium persulfate is then added in small quantities at a time, until the green aqueous solution becomes a bright yellow. On cooling to room temperature, the trivalent cobalt salt $K_5CO^{(III)}W_{12}O_{40}$ precipitates in the form of golden yellow needles. Upon dissolving the precipitated salt in hot water, and percolating it on an Amberlite IR-120 resin exchange column, the acid is obtained in free form. Upon evaporating the solution under vacuum, the corresponding acid $H_5CO^{(III)}W_{12}O_{40}$ is obtained as a yellow-coloured crystalline compound.

EXAMPLE 6

Synthesis of the Acid $H_5FeW_{12}O_{40}$ 8.6 g of ferric nitrate with nine molecules of crystallization water, are dissolved in 100 ml of distilled water to which 15 ml of a saturated solution of sodium acetate are added.

This solution is added dropwise to a hot solution (70° C.) consisting of 250 ml of nitric acid 1N, in which 56 g of di-hydrate sodium tungstate have already been dissolved.

At the end of the addition, the solution is refluxed for 16 hours, the previous solution is concentrated until it reaches a volume of 200 ml. It is then cooled to room temperature and is treated with the Drechsel method, extracting the hetero polyacid as a complex with diethyl ether.

By evaporating the ether, the hetero polyacid $H_5FeW_{12}O_{40}$ is obtained in the form of yellow needle-shaped crystals.

EXAMPLE 7

Synthesis of the Acid $H_5Mn^{(III)}W_{12}O_{40}$ 56.12 g of di-hydrate sodium tungstate are dissolved in 400 ml of distilled water, to which 194 ml of nitric acid 1N, are added, and the solution is brought to boiling point. 7 g of manganese sulfate tetrahydrate and 9 g of ammonium persulfate are added to the previous boiling solution in small quantities at a time. A dark red-coloured solution is obtained, due to the presence of manganese (III), which is evaporated until a final volume of 200 ml is obtained. 100 ml of a saturated solution of potassium nitrate are added to this limpid dark red-coloured solution.

After a short time, upon cooling the solution to 6° C., large dark red-coloured crystals of $K_5Mn^{(III)}W_{12}O_{40}$ are formed, which are separated by filtration and dried in a drier on $P_2O_5$ under vacuum.

Upon dissolving the precipitated salt in hot water and percolating it on an Amberlite IR-120 resin exchange column, the acid is obtained in free form.

EXAMPLE 8

Synthesis of the Acid $H_6CuW_{12}O_{40}$ 56.12 g of di-hydrate sodium tungstate are dissolved in 300 ml of distilled water, to which 194 ml of nitric acid 1N, are added, and the solution is heated to 70° C. Maintaining the previous solution at 70° C., a solution consisting of 7.4 g of copper nitrate hexahydrate in 300 ml of distilled water is added very slowly (6 hours). During the addition, a small quantity of blue-green precipitate is formed, which is eliminated by filtration. The limpid yellow-green solution is concentrated to a volume of about 50 ml. A small quantity of a further precipitate is formed, which is removed by filtration. The previous solution is then cooled to room temperature, an equal volume of ethyl ether is added and the solution is treated with the Drechsel method, extracting the hetero polyacid as a complex with diethyl ether.

By evaporating the ether, the hetero polyacid $H_6CuW_{12}O_{40}$ is obtained in the form of yellow-green crystals which are extremely soluble in water. These crystals are dried and preserved in a drier under vacuum, on $P_2O_5$ for a week.

EXAMPLE 9

Oxidation of $H_2S$ with a Solution of Trivalent Iron and $H_4PVMo_{11}O_{40}$ 10.85 g of $Fe(NO_3)_3 \cdot 9H_2O$ (equal to 1.5 g/l of iron and therefore 0.0268 moles/l of $Fe^{3+}$) are dissolved in 1,000 ml of distilled water, obtaining a limpid solution with a pH of about 1. 10.85 g of $H_4PVMo_{11}O_{40}$ prepared according to Example 1 (equal to 0.0061 moles with a molar ratio $H_4PVMo_{11}O_{40}$/Fe equal to 1/4.4), are added to this solution. A gaseous mixture consisting of nitrogen at 90% and $H_2S$ at 10% by volume is passed into this limpid orange-coloured solution, at a flow-rate of 300 ml/h for a period of 10 hours (for a number of $H_2S$ moles equal to 0.0134). The oxidation of hydrogen sulfide to sulfur is obtained, with an average conversion thereof (measured by means of gaschromatography) equal to 98%. The concentration of trivalent iron is contemporaneously determined by means of quantitative EPR. At the end of ten hours, all the trivalent iron has been transformed into bivalent iron, whereas there is no significant reduction in the hetero polyacid. During the reaction, the solution changes colour from its original orange to a dark green. The yellow-coloured sulfur formed with a weight equal to 412 mg, is filtered. The sulfur is obtained in crystalline form and can be easily filtered on a sintered glass filter, without the necessity of adding any surface-active agent. From X-ray diffraction on the sample, no other peaks appear than those of sulfur, excluding the presence of other crystalline phases (metal sulfides).

Air is passed for 4 hours into the solution containing bivalent iron coming from the previous reaction and the hetero polyacid, heated to 80° C., obtaining the complete oxidation of bivalent iron to trivalent iron (determined by means of quantitative EPR).

The re-oxidized solution is treated again with a stream of $H_2S$ at 10% in nitrogen, (under the conditions described above), obtaining an average conversion of 96% of the hydrogen sulfide present to sulfur. The oxidation cycles of hydrogen sulfide to sulfur, filtration of the sulfur and re-oxidation of the solution with air are repeated four times, on the same solution, without there being any decrease in the catalytic performances.

EXAMPLE 10

Oxidation of $H_2S$ with a Solution of Trivalent Iron and $H_5PV_2Mo_{10}O_{40}$ 10.85 g of $Fe(NO_3)_3 \cdot 9H_2O$ (equal to 1.5 g/l of iron and therefore 0.0268 moles/l of $Fe^{3+}$) are dissolved in 1,000 ml of distilled water, obtaining a limpid solution with a pH of about 1. 10.85 g of $H_5PV_2Mo_{10}O_{40}$ prepared according to Example 2 (equal to 0.0062 moles with a molar ratio $H_5PV_2Mo_{10}O_{40}$/Fe equal to 1/4.3), are added to this solution. A gaseous mixture consisting of nitrogen at 90% and $H_2S$ at 10% by volume is passed into this limpid orange-coloured solution, at a flow-rate of 300 ml/h for a period of 10 hours (for a number of $H_2S$ moles equal to 0.0134). The oxidation of hydrogen sulfide to sulfur is obtained, with an average conversion thereof (measured by means of gaschromatography) equal to 98%. The concentration of trivalent iron is contemporaneously determined by means of quantitative EPR. At the end of ten hours, all the trivalent iron has been transformed into bivalent iron, whereas there is no significant reduction in the hetero polyacid. During the reaction, the solution changes colour from its original orange to dark green. The yellow-coloured sulfur formed, with a weight equal to 420 mg, is filtered. The sulfur is obtained in crystalline form and can be easily filtered on a sintered glass filter, without the necessity of adding any surface-active agent.

From X-ray diffraction on the sample, no other peaks are observed than those of sulfur, excluding the presence of other crystalline phases (metal sulfides).

Air is passed into the solution containing bivalent iron coming from the previous reaction and the hetero polyacid, heated to 80° C., obtaining the complete oxidation of bivalent iron to trivalent iron (determined by means of quantitative EPR).

The re-oxidized solution is treated again with a stream of $H_2S$ at 10% in nitrogen, under the conditions described above, obtaining an average conversion of 98% of the hydrogen sulfide present to sulfur. The oxidation cycles of hydrogen sulfide to sulfur, filtration of the sulfur and re-oxidation of the solution with air are repeated twice, on the same solution, without there being any decrease in the catalytic performances.

EXAMPLE 11

Oxidation of $H_2S$ with a Solution of Trivalent Iron and $H_6PV_3Mo_9O_{40}$ 10.85 g of $Fe(NO_3)_3 \cdot 9H_2O$ (equal to 1.5 g/l of iron and therefore 0.0268 moles/l of $Fe^{3+}$) are dissolved in 1,000 ml of distilled water, obtaining a limpid solution with a pH of about 1. 10.85 g of $H_6PV_3Mo_9O_{40}$ prepared according to Example 3 (equal to 0.0064 moles with a molar ratio $H_6PV_3Mo_9O_{40}$/Fe equal to 1/4.2), are added to this solution. A gaseous mixture consisting of nitrogen at 90% and $H_2S$ at 10% by volume is passed into this limpid orange-coloured solution, at a flow-rate of 300 ml/h for a period of 10 hours (for a number of $H_2S$ moles equal to 0.0134).

The oxidation of hydrogen sulfide to sulfur is obtained, with an average conversion thereof (measured by means of gaschromatography) equal to 98%. The concentration of trivalent iron is contemporaneously determined by means of quantitative EPR. At the end of ten hours, all the trivalent iron has been transformed into bivalent iron, whereas there is no significant reduction in the hetero polyacid. During the reaction, the solution changes colour from its original orange to dark green. The yellow-coloured sulfur formed, with a weight equal to 408 mg, is filtered. The sulfur is obtained in crystalline form and can be easily filtered on a sintered glass filter, without the necessity of adding any surface-active agent.

From X-ray diffraction on the sample, no other peaks are observed than those of sulfur, excluding the presence of other crystalline phases (metal sulfides).

Air is passed into the solution containing bivalent iron coming from the previous reaction and the hetero polyacid, heated to 80° C., obtaining the complete oxidation of bivalent iron to trivalent iron (determined by means of quantitative EPR).

The re-oxidized solution is treated again with a stream of $H_2S$ at 10% in nitrogen, under the conditions described above, obtaining an average conversion of 98% of the hydrogen sulfide present to sulfur. The oxidation cycles of hydrogen sulfide to sulfur, filtration of the sulfur and re-oxidation of the solution with air are repeated twice, on the same solution, without there being any decrease in the catalytic performances.

EXAMPLE 12

Oxidation of $H_2S$ with a Solution of Trivalent Iron and $H_6PV_3W_9O_{40}$ 10.85 g of $Fe(NO_3)_3 \cdot 9H_2O$ (equal to 1.5 g/l of iron and therefore 0.0268 moles/l of $Fe^{3+}$) are dissolved in 1,000 ml of distilled water, obtaining a limpid solution with a pH of about 1. 10.85 g of $H_6PV_3W_9O_{40}$ prepared according to Example 2 (equal to 0.0039 moles with a molar ratio $H_6PV_3W_9O_{40}$/Fe equal to 1/6.9), are added to this solution. A gaseous mixture consisting of nitrogen at 90% and $H_2S$ at 10% by volume is passed into this limpid orange-coloured solution, at a flow-rate of 300 ml/h for a period of 10 hours (for a number of $H_2S$ moles equal to 0.0134).

The oxidation of hydrogen sulfide to sulfur is obtained, with an average conversion thereof (measured by means of gaschromatography) equal to 99%. The concentration of trivalent iron is contemporaneously determined by means of quantitative EPR. At the end of ten hours, all the trivalent iron has been transformed into bivalent iron, whereas there is no significant reduction in the hetero polyacid. During the reaction, the solution changes colour from its original orange to brown-green. The yellow-coloured sulfur formed, with a weight equal to 430 mg, is filtered. The sulfur is obtained in crystalline form and can be easily filtered on a sintered glass filter, without the necessity of adding any surface-active agent.

From X-ray diffraction on the sample, no other peaks are observed than those of sulfur, excluding the presence of other crystalline phases (metal sulfides).

Air is passed for three hours into the solution containing bivalent iron coming from the previous reaction and the hetero polyacid, heated to 80° C., obtaining the complete oxidation of bivalent iron to trivalent iron (determined by means of quantitative EPR).

The re-oxidized solution is treated again with a stream of $H_2S$ at 10% in nitrogen, under the conditions described above, obtaining an average conversion of 98% of the hydrogen sulfide present to sulfur. The oxidation cycles of hydrogen sulfide to sulfur, filtration of the sulfur and re-oxidation of the solution with air are repeated twice, on the same solution, without there being any decrease in the catalytic performances.

EXAMPLE 13

Oxidation of $H_2S$ with a Solution of $H_5CoW_{12}O_{40}$ 25.20 g of $H_5CoW_{12}O_{40}$ prepared according to Example 5 (equal to 0.0086 moles), are dissolved in 1,000 ml of distilled water and brought to pH 1 with nitric acid. A gaseous mixture consisting of nitrogen at 90% and $H_2S$ at 10% by volume is passed into this limpid yellow-coloured solution, at a flow-rate of 300 ml/h for a period of 3 hours and 10 minutes (for a number of H₂S moles equal to 0.0043). The oxidation of hydrogen sulfide to sulfur is obtained, with an average conversion thereof (measured by means of gaschromatography) equal to 96%. The concentration of trivalent cobalt is contemporaneously determined by means of quantitative EPR. At the end of three hours and 10 minutes, all the trivalent cobalt has been transformed into bivalent cobalt. During the reaction, the solution changes colour from its original yellow to emerald green. The yellow-coloured sulfur formed, with a weight equal to 130 mg, is filtered. The sulfur is obtained in crystalline form and can be easily filtered on a sintered glass filter, without the necessity of adding any surface-active agent.

From X-ray diffraction on the sample, no other peaks are observed than those of sulfur, excluding the presence of other crystalline phases (metal sulfides).

Air is passed into the solution containing bivalent cobalt coming from the previous reaction, heated to 80° C., obtaining the complete oxidation of bivalent cobalt to trivalent cobalt (determined by means of quantitative EPR).

The re-oxidized solution is treated again with a stream of H₂S at 10% in nitrogen, under the conditions described above, obtaining an average conversion of 96% of the hydrogen sulfide present to sulfur. The oxidation cycles of hydrogen sulfide to sulfur, filtration of the sulfur and re-oxidation of the solution with air are repeated twice, on the same solution, without there being any decrease in the catalytic performances.

EXAMPLE 14

Oxidation of $H_2S$ with a Solution of $H_5FeW_{12}O_{40}$ 25.18 g of $H_5FeW_{12}O_{40}$ prepared according to Example 6 (equal to 0.0086 moles), are dissolved in 1,000 ml of distilled water and brought to pH 1 with nitric acid. A gaseous mixture consisting of nitrogen at 90% and H₂S at 10% by volume is passed into this limpid yellow-coloured solution, at a flow-rate of 300 ml/h for a period of 3 hours and 10 minutes (for a number of H₂S moles equal to 0.0043). The oxidation of hydrogen sulfide to sulfur is obtained, with an average conversion thereof (measured by means of gaschromatography) equal to 96%. The concentration of trivalent iron is contemporaneously determined by means of quantitative EPR. At the end of three hours and 10 minutes, all the trivalent iron has been transformed into bivalent iron. During the reaction, the solution changes colour from its original yellow to brown. The yellow-coloured sulfur formed, with a weight equal to about 126 mg, is filtered. The sulfur is obtained in crystalline form and can be easily filtered on a sintered glass filter, without the necessity of adding any surface-active agent.

From X-ray diffraction on the sample, no other peaks are observed than those of sulfur, excluding the presence of other crystalline phases (metal sulfides).

Air is passed into the solution containing bivalent iron coming from the previous reaction, heated to 80° C., obtaining the complete oxidation of bivalent iron to trivalent iron (determined by means of quantitative EPR).

The re-oxidized solution is treated again with a stream of H₂S at 10% in nitrogen, under the conditions described above, obtaining an average conversion of 96% of the hydrogen sulfide present to sulfur. The oxidation cycles of hydrogen sulfide to sulfur, filtration of the sulfur and re-oxidation of the solution with air are repeated twice, on the same solution, without there being any decrease in the catalytic performances.

EXAMPLE 15

Oxidation of $H_2S$ with a Solution of $H_5MnW_{12}O_{40}$ 25.27 g of $H_5MnW_{12}O_{40}$ prepared according to Example 7 (equal to 0.0086 moles), are dissolved in 1,000 ml of distilled water and brought to pH 1 with nitric acid. A gaseous mixture consisting of nitrogen at 90% and H₂S at 10% by volume is passed into this limpid red-coloured solution, at a flow-rate of 300 ml/h for a period of 3 hours and 10 minutes (for a number of H₂S moles equal to 0.0043). The oxidation of hydrogen sulfide to sulfur is obtained, with an average conversion thereof (measured by means of gaschromatography) equal to 96%. The concentration of trivalent manganese is contemporaneously determined by means of quantitative EPR. At the end of three hours and 10 minutes, all the trivalent manganese has been transformed into bivalent manganese. During the reaction, the solution changes colour from its original dark red to a very light pink. The yellow-coloured sulfur formed, with a weight equal to about 118 mg, is filtered. The sulfur is obtained in crystalline form and can be easily filtered on a sintered glass filter, without the necessity of adding any surface-active agent.

From X-ray diffraction on the sample, no other peaks are observed than those of sulfur, excluding the presence of other crystalline phases (metal sulfides).

Air is passed into the solution containing bivalent manganese coming from the previous reaction, heated to 80° C., obtaining the complete oxidation of bivalent manganese to trivalent manganese (determined by means of quantitative EPR).

The re-oxidized solution is treated again with a stream of H₂S at 10% in nitrogen, under the conditions described above, obtaining an average conversion of 96% of the hydrogen sulfide present to sulfur. The oxidation cycles of hydrogen sulfide to sulfur, filtration of the sulfur and re-oxidation of the solution with air are repeated twice, on the same solution, without there being any decrease in the catalytic performances.

EXAMPLE 16

Oxidation of $H_2S$ with a Solution of $H_6CuW_{12}O_{40}$ 25.30 g of $H_6CuW_{12}O_{40}$ prepared according to Example 8 (equal to 0.0086 moles), are dissolved in 1,000 ml of distilled water and brought to pH 1 with nitric acid. A gaseous mixture consisting of nitrogen at 90% and H₂S at 10% by volume is passed into this limpid yellow-green-coloured solution, at a flow-rate of 3.00 ml/h for a period of 3 hours and 10 minutes (for a number of H₂S moles equal to 0.0043). The oxidation of hydrogen sulfide to sulfur is obtained, with an average conversion thereof (measured by means of gaschromatography) equal to 99%. During the reaction, the solution changes from its original yellow-green colour and becomes colourless. The sulfur formed, with a weight equal to about 132 mg, is filtered. The sulfur is obtained in crystalline form and can be easily filtered on a sintered glass filter, without the necessity of adding any surface-active agent.

Air is passed into the solution containing copper in a presumably reduced form coming from the previous reaction, heated to 80° C., obtaining the oxidation of the copper.

The re-oxidized solution is treated again with a stream of H₂S at 10% in nitrogen, under the conditions described above, obtaining an average conversion of 97% of the hydrogen sulfide present to sulfur. The oxidation cycles of hydrogen sulfide to sulfur, filtration of the sulfur and re-oxidation of the solution with air are repeated twice, on the same solution, without there being any decrease in the catalytic performances.

EXAMPLE 17

Comparative (Oxidation of $H_2S$ with a Solution of Trivalent Iron without Hetero Polyacid 10.85 g of $Fe(NO_3)_3 \cdot 9H_2O$ (equal to 1.5 g/l of iron and therefore 0.0268 moles/l of $Fe^{3+}$) are dissolved in 1,000 ml of distilled water, obtaining a limpid solution with a pH of about 1. A gaseous mixture consisting of nitrogen at 90% and $H_2S$ at 10% by volume is passed into this limpid colourless solution, at a flow-rate of 300 ml/h for a period of 10 hours (for a number of $H_2S$ moles equal to 0.0134).

The oxidation of hydrogen sulfide to sulfur is obtained, with an average conversion thereof (measured by means of gaschromatography) equal to 98%. The concentration of trivalent iron is contemporaneously determined by means of quantitative EPR. At the end of ten hours, all the trivalent iron has been transformed into bivalent iron.

The yellow-coloured sulfur formed, with a weight equal to 424 mg, is filtered. The sulfur is obtained in crystalline form and can be easily filtered on a sintered glass filter, without the necessity of adding any surface-active agent.

Air is passed for 72 hours into the solution coming from the previous reaction, heated to 80° C.

When treated again with $H_2S$ at 10% in nitrogen, under the conditions described above, this solution is not capable of oxidizing the hydrogen sulfide to sulfur, whose conversion (determined by means of gaschromatography) remains zero.

EXAMPLE 18 Comparative

Oxidation of $H_2S$ with a Solution of $H_4PvMo_{11}O_{40}$ without Trivalent Iron 10.85 g $H_4PvMo_{11}O_{40}$ (equal to 0.0061 moles/l of hetero polyacid), are dissolved in 1,000 ml of distilled water obtaining a limpid orange-coloured solution with a pH of about 1. A gaseous mixture consisting of nitrogen at 90% and $H_2S$ at 10% by volume is passed into this limpid colourless solution, at a flow-rate of 300 ml/h for a period of 5 hours (for a number of $H_2S$ moles equal to 0.0067). The oxidation of hydrogen sulfide to sulfur is obtained, with an average conversion thereof (measured by means of gaschromatography) equal to 95%.

During the reaction, the previous solution changes from its original orange colour to dark blue, a clear sign of the reduction of hetero polyacid.

This reduction is confirmed by means of EPR on vanadium. The grey-coloured sulfur formed, with a weighs of 150 mg, is filtered. The sulfur is obtained in crystalline form and can be easily filtered on a sintered glass filter, without the necessity of adding any surface-active agent.

Air is passed for 24 hours into the solution coming from the previous reaction, heated to 80° C. After this period, the solution remains dark blue due to the reduced hetero polyacid and does not become orange again.

When treated again with $H_2S$ at 10% in nitrogen under the conditions described above, this solution is not capable of oxidizing the hydrogen sulfide to sulfur, whose conversion (determined by means of gaschromatography) remains zero.

The invention claimed is:

1. A process for the oxidation of hydrogen sulfide, comprising:

a) contacting a gas comprising $H_2S$ with an aqueous acid solution comprising trivalent iron and a hetero polyacid having redox properties, as such or partially salified with an alkaline metal or with ammonium, said polyacid represented by formula (I):

$$H_nXV_yM_{(12-y)}O_{40} \qquad (I)$$

wherein
 n is an integer ranging from 3 to 6,
 X is an element selected from the group consisting of P, Si, As, B, and Ge,
 y is an integer ranging from 1 to 3, and
 M is selected from the group consisting of Mo and W;

b) filtering and separating sulfur resulting from said contacting wherein said trivalent iron is reduced to bivalent iron;

c) re-oxidizing said bivalent iron to trivalent iron with a gaseous stream comprising oxygen; and d) recycling a solution comprising trivalent iron and the hetero polyacid to step a).

2. The process according to claim 1, wherein the hetero polyacid is in the form of a water insoluble solid, formed by:
 partial or complete salificating with a metal to form an insoluble salt, wherein said metal is selected from the group consisting of cesium, ammonium, potassium, silver and thallium(I);
 laying and immobilizing on silica;
 laying and immobilizing on mesoporous molecular sieves; and
 laying and immobilization immobilizing on activated carbon.

3. A process for the oxidation of hydrogen sulfide, comprising:

$a_1$) contacting a gas comprising $H_2S$ with an aqueous acid solution comprising a hetero polyacid having redox properties, as such or partially salified, with an alkaline metal or with ammonium, said polyacid represented by formula (II):

$$H_nMeM_{12}O_{40} \qquad (II)$$

wherein
 n is an integer ranging from 2 to 7,
 Me is selected from the group consisting of Fe, Co, Mn, Cu, and Cr, and
 M is selected from the group consisting of Mo and W;

$b_1$) filtering and separating sulfur resulting from said contacting wherein said element Me is reduced;

$c_1$) re-oxidizing the element Me with a gaseous stream comprising oxygen to form a re-oxidized solution; and $d_1$) recycling the re-oxidized solution to step a).

4. The process according to claim 1, wherein the trivalent iron is present as a salt of an inorganic acid.

5. The process according to claim 4, wherein the acid is selected from the group consisting of nitric acid, sulfuric acid, and phosphoric acid.

6. The process according to claim 1, wherein the trivalent iron is present in the solution in concentrations ranging from 0.01 to 10 moles/l.

7. The process according to claim 1, wherein the hetero polyacid compound (I) is present in concentrations ranging from 0.01 to 0.3 moles/l.

8. The process according to claim 6, wherein the molar ratio hetero polyacid compound (I)/trivalent iron ranges from 1/1 to 1/30.

9. The process according to claim 3, wherein the hetero polyacid compound (II) is present in concentrations ranging from 0.01 to 0.3 moles/l.

10. The process according to claim 1, wherein the aqueous acid solution has a pH ranging from 0 to 6.

11. The process according to claim 1, wherein the hydrogen sulfide is present in the gas in a concentration ranging from 0.1 to 30% by volume, the remaining percentage consisting of a gas which is inert under the reaction conditions.

12. The process according to claim 11, wherein the inert gas is methane gas or natural gas.

13. The process according to claim 1, wherein the re-oxidation step takes place at a temperature ranging from 20 to 100° C. and at a pressure greater than or equal to atmospheric pressure.

14. The process according to claim 1, wherein said gaseous stream comprises air, oxygen-enriched air, or oxygen.

\* \* \* \* \*